United States Patent [19]

Haughland et al.

[11] Patent Number: 4,721,180
[45] Date of Patent: Jan. 26, 1988

[54] MARINE SEISMIC SOURCE ARRAY

[75] Inventors: Tor A. Haughland; Mark Houston; Philip M. Fontana, all of Houston, Tex.

[73] Assignee: Western Atlas International, Inc., Houston, Tex.

[21] Appl. No.: 935,280

[22] Filed: Nov. 26, 1986

[51] Int. Cl.[4] .................... G01V 1/00; B63B 21/16
[52] U.S. Cl. .................................... 181/111; 367/16; 367/153; 114/245; 114/253
[58] Field of Search .................................... 367/15-20, 367/106, 130, 144, 153, 173; 181/108-114, 118, 120, 402; 73/170 A; 114/326, 330, 244-246, 249, 250, 253

[56] References Cited

U.S. PATENT DOCUMENTS

| | | | |
|---|---|---|---|
| 3,638,752 | 2/1972 | Wakefield | 367/144 X |
| 3,893,539 | 7/1975 | Mott-Smith | 181/115 |
| 3,953,826 | 4/1976 | Brundrit et al. | 340/7 |
| 4,130,078 | 12/1978 | Cholet | 367/15 X |
| 4,136,754 | 1/1979 | Manin | 181/111 |
| 4,323,989 | 4/1982 | Huckabee et al. | 181/118 X |
| 4,493,061 | 1/1985 | Ray | 181/111 X |
| 4,552,086 | 11/1985 | Boe et al. | 114/242 |

FOREIGN PATENT DOCUMENTS

| | | | |
|---|---|---|---|
| 18053 | 10/1980 | European Pat. Off. | 367/17 |
| 168959 | 1/1986 | European Pat. Off. | 367/16 |
| 2557309 | 6/1985 | France | 367/16 |
| 202089 | 11/1984 | Japan | 367/16 |
| 843010 | 7/1984 | Norway. | |
| 826932 | 1/1960 | United Kingdom | 181/118 |
| 1193507 | 6/1970 | United Kingdom. | |
| 2109935 | 6/1983 | United Kingdom | 367/16 |
| 2148503A | 5/1985 | United Kingdom. | |
| 2162315A | 1/1986 | United Kingdom. | |

OTHER PUBLICATIONS

M. Lowell Collier, "Design of a Shipboard Handling System for a Ten Air Gun Array", Oceans 81 Conference Report, Boston, Mass., Sep. 81, pp. 1049-1052.

G. C. Smith, "Three-Dimensional Air Gun Arrays", pp. 282-285, SEG Expanded Abstracts of the 1984 Technical Program.

Primary Examiner—Charles T. Jordan
Assistant Examiner—Brian S. Steinberger
Attorney, Agent, or Firm—E. Eugene Thigpen

[57] ABSTRACT

The invention is a deployment system for a marine seismic source array. A plurality of sources are suspended at different depths from a float. The system is adapted for deploying the float and the sources into the water and retrieving them for reloading onto the vessel. When the float is positioned on the water surface the sources sink to preselected water depths. The sources are retracted to the underside of the float in the retrieval process.

2 Claims, 3 Drawing Figures

MARINE SEISMIC SOURCE ARRAY

BACKGROUND OF THE INVENTION

1. Field of the Invention

This invention relates to seismic sources used in marine operations, and more specifically to systems for deploying such sources.

2. Discussion of the Prior Art

To obtain information on substrata located below a body of water, seismic sources adapted for generating an acoustic signal in the water are towed through the water by towing vessels. The acoustic signal generated in the water travels in all directions, and part of this acoustic energy, after having been reflected or refracted by the substrata, returns to the body of water overlying the substrata, and is detected by the hydrophones of a detector cable that is towed through the water in the neighborhood of the seismic source.

The marine sources most commonly used today are impulsive sources such as air guns. See, for example, U.S. Pat. No. 3,638,752, issued Feb. 1, 1972 to Wakefield. Another type of impulsive source is the water gun. Such sources generate not only the primary pulse, but also unwanted pulses commonly called "ghost" pulses and bubble pulses. These pulses produce unwanted components in the seismic signal transmitted into the earth. The most commonly used marine source today is the air gun and the discussion hereafter will generally refer to air guns, although the principles are not limited to air guns.

Initially, the acoustic wave from a marine source element travels along a spherical wave front. However, when the wave front traveling in an upward direction reaches the water surface, the large velocity discontinuity at the air-water interface causes a "ghost" reflection, which then follows the primary pulse into the substrata.

Air guns, which generate an acoustic wave by the sudden release of a compressed gas into the water, also generate a train of bubble pulses. When the compressed gas is released from the air gun, a gas bubble expands outwardly from the source until the pressure inside the bubble reduces to the point that the hydrostatic pressure of the water causes the bubble to contract. This contraction of the air bubble increases the air pressure within the air bubble again until the internal air bubble pressure exceeds the hydrostatic pressure and the bubble again expands, thereby causing a secondary or bubble pulse. Normally, a series of these bubble pulses will be emitted.

Use of a single source results in a seismic signal whose frequency spectrum exhibits a series of peaks and notches related to the bubble pulse oscillation period. It is a common practice in the industry to utilize an array of air guns of different sizes with different oscillation periods in order to produce a seismic signal having a flatter frequency spectrum. It is also known that the spacing between the air guns can be chosen so as to modify the individual bubble pulse oscillation periods.

Even after the array is "tuned" by the appropriate selection of air gun sizes and spacing between the air guns, the frequency spectrum retains a strong ghost notch. The ghost notch results from the interference between the primary downgoing pulse and the secondary pulse (ghost pulse) which is the reflection of the primary pulse from the water-air interface. The phase differences between the two pulses causes attenuation of spectral components within the bandwidth of the source signatures. Attenuation is most severe at the frequencies where the two pulses are 180° out of phase. At normal incidence, the fundamental ghost frequency for a given source depth can be calculated from $$fg = Vw/2d = 1/\Delta tg$$

where
 $fg$ = ghost notch frequency
 $Vw$ = compressional wave velocity of the water
 $d$ = source depth
 $\Delta tg$ = time delay between the two pulses.

At incidence angles other than normal, the time delay between the two pulses is not only a function of source depth and water velocity but also of the angle at which the primary pulse is reflected at the water-air interface. As this reflection angle increases, the ghost notch frequency increases.

Normally, the deconvolution process is relied on to remove the effects of the source signature characteristics from the recorded seismic data. Deconvolution methods rely on an operator normally designed from a signature measured directly below the source. The signature is the recording of the pressure amplitude, as a function of time, of the pressure wave generated by a source. However, since marine seismic data are recorded at receiver positions with lateral offsets from the source ranging from several hundred to several thousand meters, the influence of the source ghost will be different at each receiver location because of the change in the surface reflection angle. This situation can produce instabilities in the deconvolution process.

Further, the amplitude of the ghost pulse is dependent upon the magnitude of the reflection coefficient of the water-air interface. Typically a value of $-1.0$ is assumed for this parameter. However, this value may be a function of the surface wave height and period. Variations in the seismic signal transmitted into the earth due to changes in the water-air surface reflection coefficient can seriously affect the results of deconvolution processes employing an average signature.

All of the difficulties generated by the presence of a source ghost can be remedied if the source can be configured to suppress the generation of the ghost pulse.

United Kingdom Pat. No. 1,193,507, Cholet et al, published June 3, 1970, discloses the placing of a plurality of explosive sources at different depths and producing an emission of sound waves from each source successively at time intervals so that waves propagated downwardly are additive, and waves propagated toward the water surface tend to neutralize. Such an arrangement reduces the ghost pulse.

In the paper presented at the 1984 Annual meeting of the SEG, "Three-Dimensional Air Gun Arrays" by G. C. Smith, there is disclosed a system of four subarrays deployed at different depths and fired at different times. These subarrays are positioned 15 meters and 37.5 meters on each side of a center line, making the four element array 75 meters wide.

U.K. Patent Application No. 2148503A, published May 30, 1985, shows the use of a plurality of implosive sources at different depths whose firing times are controlled to decrease the effect of the reflection of the wave field from the air-sea interface.

The prior art does not show, however, a system for deploying a source array having a plurality of source elements at each of a plurality of depths and in which the source elements are all suspended from a single float to produce an acoustic signal which is tuned to optimize suppression of both ghost effects and residual bubble pulses.

Deploying such an array by means of a single float makes it easier to maintain both the vertical and horizontal distances between all source elements substantially constant. Maintaining constant distances between all source elements is important because the seismic signal generated by the array will change if the spacing between the elements changes. In addition, directive extended source arrays may be formed from a plurality of identical nondirective subarrays without changing the signature of the downgoing wave.

SUMMARY OF THE INVENTION

The invention comprises a deployment system for a marine seismic source array. A plurality of sources are suspended beneath a float. The suspension means are adapted to suspend the sources at different selected depths during seismic operations. Hoisting means, in sliding engagement with the float and attached to mounting means onto which the seismic sources are affixed are adapted to retract the mounting members to the underside of the float and then to lift the float, together with the source array from the water or conversely to lower the float together with the source array to the water and then permit the sources to sink to said different selected depths.

BRIEF DESCRIPTION OF THE DRAWINGS

A more complete understanding of this invention may be gained from the appended detailed description and the drawings, wherein.

DESCRIPTION OF THE PREFERRED EMBODIMENT

In marine seismic surveying, it is normal for a seismic vessel to track along a predetermined course on the surface of a body of water, normally the sea. An energy source is towed by the vessel for imparting acoustic signals downwardly into the water. Also towed by the vessel is a cable or streamer along which are located a plurality of hydrophone arrays or detectors for receiving the seismic reflection. As used hereinafter a "source element" will refer to an individual marine source, typically an air gun. The term "source array" will refer to the source elements deployed with a single float. The term "extended source array" will refer to a plurality of source arrays operated conjunctively.

Figure 1:
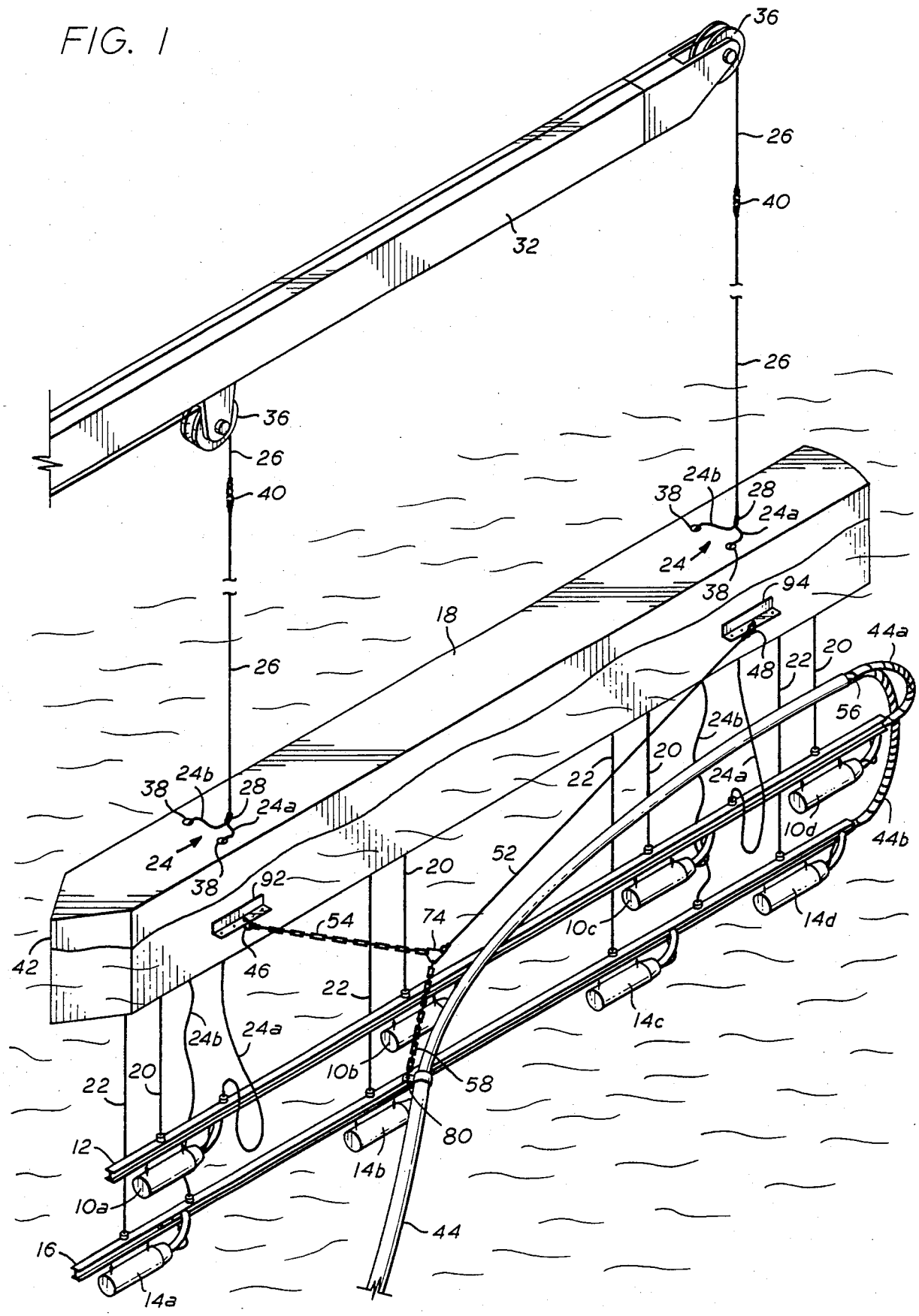
FIG. 1 shows the deployment system with the source array positioned in the water.
Figure 2:
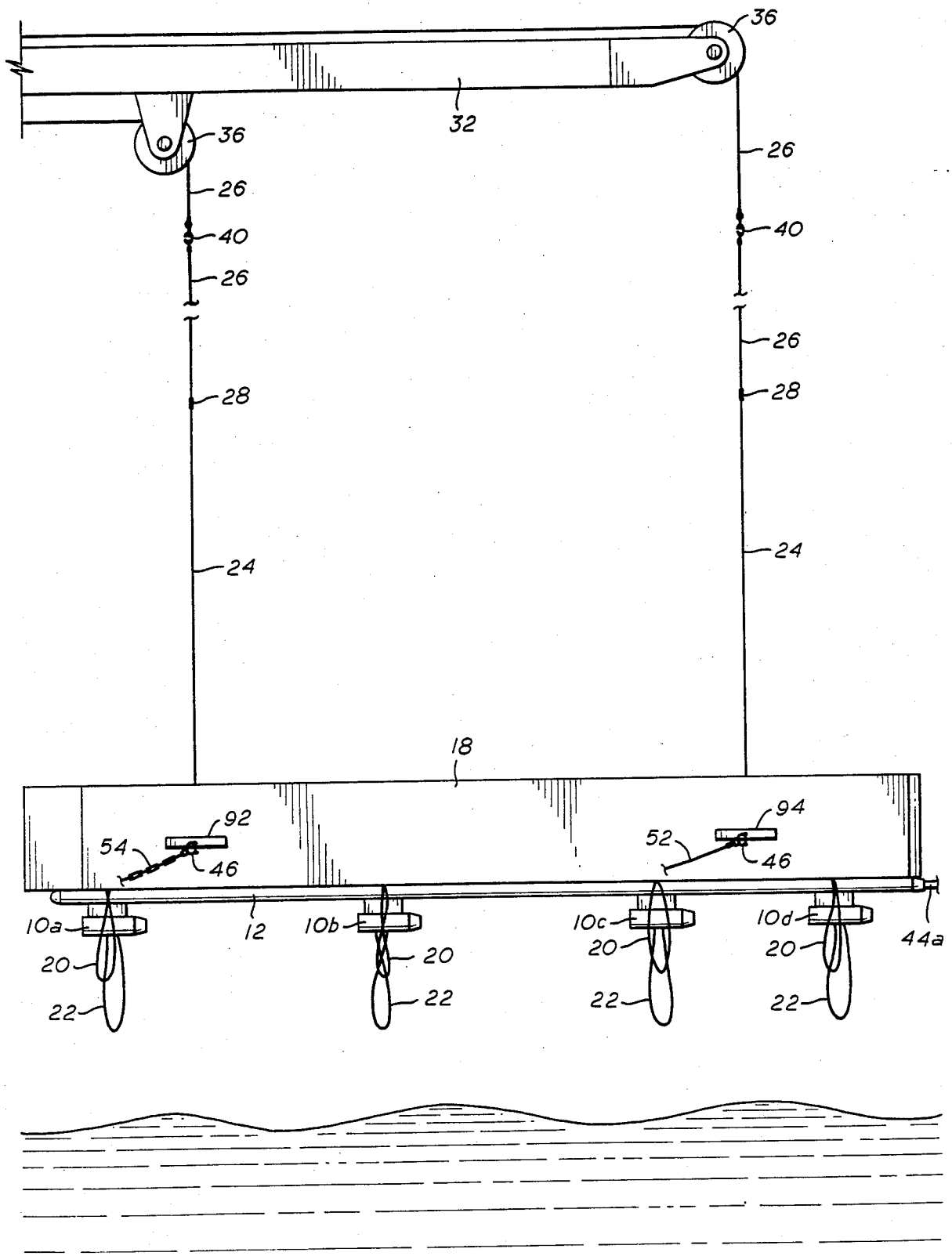
FIG. 2 shows the deployment system being lowered toward the water, with the source array in a retracted position beneath the float.

The invention comprises a deployment system for a source array. Prior to beginning a seismic survey the source array is stowed on board the seismic vessel. The source array is moved from the vessel 8 (not shown in FIGS. 1 and 2) by boom 32. As shown in FIGS. 1 and 2, the array is suspended by means of hoist wires 26 from boom 32. Hoist wires 26 loop around sheaves 36 and may be payed out and taken in by means of winches (not shown), which may be mounted on the boom 32.

FIG. 1 shows the system as it would appear just after the source array is lowered into the water. Float 18 floats on the water surface 42 and may comprise an elongated member having a steel exterior filled with foam. The individual air guns, 10a, 10b, 10c, 10d, 14a, 14b, 14c and 14d, included in the source array are affixed to gun logs 12 and 16 as shown, by short segments of steel chain or other suitable means. Gun logs 12 and 16 may be steel I-beams or other suitable members. Gun logs 12 and 16 are suspended by means of hanging wires 20 and 22, respectively, from float 18. Hanging wires 20 and 22 may be ½ inch diameter steel rope. In a particular preferred embodiment, the length of hanging wires 20 and 22 are selected so that during operations, air guns 10a–d are 5 meters below the water surface and air guns 14a–d are 8 meters below the water surface.

The source array is lowered to the water and retrieved by means of hoisting wires 26 and hoisting slings 24. The hoisting wires 26 and hoisting slings 24 may be ¾ inch diameter steel rope. Each hoisting sling 24 consists of a first portion 24a affixed at one end to gun log 12, and a second portion 24b affixed at one end to gun log 16. The first and second portions of each of the hoisting slings extend through separate apertures 38 in buoy 18, and are swaged together by inserting the two portions, together with the end of a hoisting wire, through a suitable collar 28, which may be a soft metal, and then crimping the collar; or by welding the two portions of the hoisting sling to the corresponding hoisting wire. The apertures 38 need to be of sufficient diameter for the hoisting sling to slide through, which may be about 8.0 centimeters in diameter.

Hanging wires 20 and 22 may be affixed to the underside of float 18 and to the gun logs, and the hoisting slings may be affixed to the gun logs, by welding the hanging wires and hoisting slings on to pad eyes located on the float and the gun logs.

When the source array is deployed in the water as shown in FIG. 1, the bight of the hoisting sling rests on top of float 18. The two portions 24a and 24b of hoisting sling 24 are preferably of the same length, which length is sufficient so that the weight of gun log 16 is transferred to hanging wires 22 and the weight of gun log 12 is transferred to hanging wires 20 when the hoisting sling is supported on top of the float 18. At such time, the hoisting sling 24 will be slack.

After the array is deployed in the water, the boom 32 is retracted onto the vessel. Hoisting wires 26 will normally include detachable connectors 40 which may be shackles or other suitable connectors, and which are disconnected after the array is deployed in the water, and the portion of the hoisting wires extending from the float may then be coupled to mating connectors mounted at location 62 on towing cable 44 (see FIG. 3), to enable further deployment of the float to its operating position behind the vessel. This also leaves the boom free for deployment of additional arrays.

Figure 3:
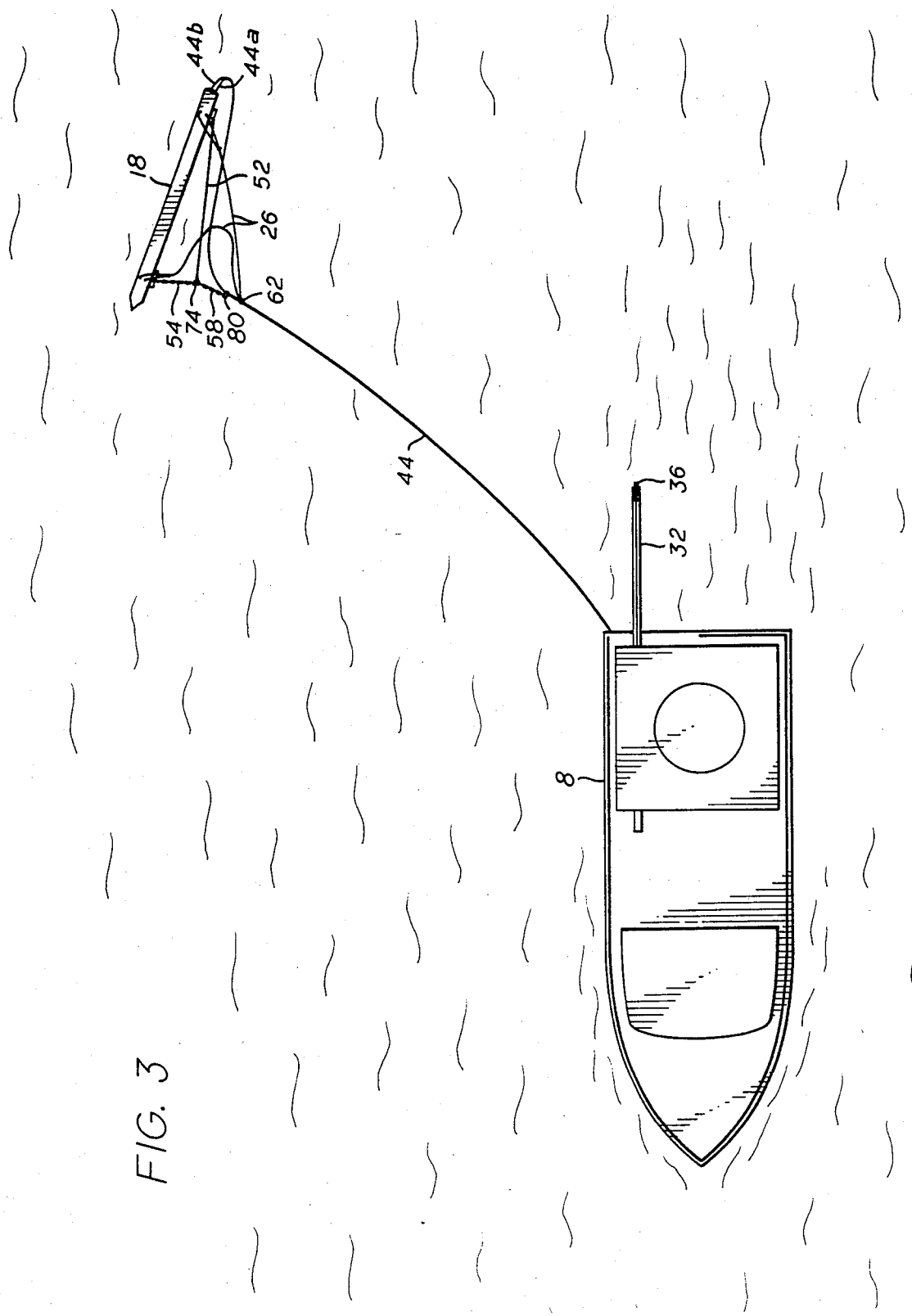
FIG. 3 shows the source array being pulled behind a vessel.

The float may be configured to act as a paravane so that it assumes an orientation such as shown in FIG. 3 when the seismic vessel is traveling at its normal speed for conducting a seismic survey. Hoses and conduits for supplying compressed air and control signals to the air guns are included in an integrated cable 44 which includes a stress member for towing the float 18 behind the vessel. Cable 44 divides into two sections at location 56, with one portion 44a providing compressed air and control signals to air guns 10a–d, and the other portion 44b providing compressed air and control signals to air guns 14a–d.

The float is connected to the towing cable 44 by a towing bridle which includes a segment of steel chain 58, a second steel chain 54, and a steel rope 52. Steel chain 58 is connected to cable 44 by a shackle 80. Steel chain 54 and steel rope 52 are attached to the float by shackles 46 and 48, respectively, which are respectively coupled through holes in angle iron segments 92 and 94, which are welded onto the side of float 18. Steel chain 58, steel chain 54, and steel rope 52 are interconnected by shackles which clasp around ring member 74. Steel chains 58 and 54 may be ¾ inch diameter steel chain and steel rope 52 may be ¾ inch diameter steel rope.

When the array is moved from the vessel by boom 32 in preparation for lowering the array to the water surface, gun logs 12 and 16 will be initially retracted to the position shown in FIG. 2. Hoisting wires 26 are payed out and the source array lowered to the water surface. Float 18 is supported on top of gun logs 12 and 16 until the float reaches the water surface at which time the float will remain at the water surface and the weight of the gun logs and the air guns will pull the hoisting slings through the apertures 38 until the weight of gun log 12 and the air guns attached thereto is supported by hanging wires 20, and the weight of gun log 16 and the air guns attached thereto is supported by hanging wires 22.

When the float 18 and the air gun array are retrieved, the process is reversed. Hoisting wires 26 are taken in from the vessel, and, initially, the hoisting slings are pulled through the apertures 38 until the gun logs 12 and 16 abut the underside of float 18. Further taking in of the hoisting wires then lifts the float from the water, and it can then be moved by means of boom 18 back onto the vessel.

The normal velocity of sound traveling in water is approximately 1500 meters per second. With seismic sources 10a-d positioned 5 meters below the water surface and seismic sources 14a-d positioned 8 meters below the water surface, the timing for ghost suppression is achieved by delaying the firing time of the deeper sources relative to the shallower sources by 3/1500 seconds (0.002 seconds). The primary downgoing pulses will add coherently, while the two ghost reflections will be out of phase.

Standard air guns such as those obtainable from Bolt Technology Corporation, Norwalk, Conn. or Litton Resources Systems, a division of Western Geophysical Company of America, Houston, Tex. may be used. In a particular implementation of the invention, the spacings between the outlets of air guns 10a and 10b, 10b and 10c, 14a and 14b, and 14b and 14c may be 3 meters, and the spacings between air guns 10c and 10d, and between 14c and 14d may be 2 meters. In a particular implementation of the invention, the horizontal spacing between the tier of arrays comprising sources 10a-d and the tier comprising 14a-d may be 42 centimeters.

The sizes of the air guns used and the spacing between the air guns will depend on the signal that it is desired to transmit into the earth. Methods of selecting the air gun sizes and the distances between the air guns are known in the art and will not be described herein. It is also well known that the depth at which the sources are positioned will influence, to a certain extent, the frequency content of the emitted seismic signal. As the position of the sources becomes deeper, the more energy will be emitted at lower frequencies. The vertical distances between the air guns may also vary, so long as the timing with which the air guns are fired with respect to each other is varied accordingly. In addition, the acoustic wave field will behave as if it originated from a true point (non-directive) source, within a desired bandwidth, if the length of the array is appropriately selected.

Although the invention has been described as a system for deploying a first tier of source elements at a first depth and a second tier of source elements at a second depth, the invention may be implemented with source elements deployed at three or more different depths. The firing times for the source elements will be altered accordingly so that waves propagated downwardly are additive, but waves first propagated toward the water surface and then reflected downward will destructively interfere.

Although specific ways and means for practicing the invention have been described herein and illustrated in the accompanying drawings, it is nevertheless to be understood that this has been done for purposes of illustration only and that the scope of the invention is not limited thereby but is determined from the appended claims.

We claim:

1. A deployment apparatus for a marine seismic source array comprising:
   a first elongated member having a plurality of sources attached thereto;
   a second elongated member having a plurality of sources attached thereto;
   a float;
   means for suspending said first elongated member beneath said float so that said seismic sources attached thereto are at a first selected water depth when said float is floating on the water surface;
   means for suspending said second member beneath said float so that seismic sources attached thereto are at a second selected water depth different from said first depth when said float is floating on the water surface;
   hoisting means affixed to said elongated members and slidably engaged with said float for retracting said first and second elongated members to engage the underside of said float and for lowering said elongated members to said different selected depths; and
   said first and second elongated members being adapted to engage said float to lift said deployment apparatus from the water.

2. A system for deploying an array of marine seismic sources;
   a float;
   a plurality of elongated members, each member having a plurality of seismic sources mounted thereon;
   a first plurality of flexible members, each affixed at one end thereof to said float and affixed at the other end thereof to a first one of said elongated members, said flexible members being adapted to suspend said first elongated member beneath said float at a first distance;
   a second plurality of flexible members, each affixed at a first end thereof to said float and affixed at an end opposite to said first end to a second one of said elongated members, said second plurality of flexible members being adapted to suspend said second elongated member beneath said float at a second distance greater than said first distance; and
   means slidably engaged with said float for retracting said first and second elongated members until said first and second elongated members contact the underside of said float and adapted to lift said float from said water surface if said means is further retracted after said elongated members contact the underside of said float, whereby said apparatus may be conveniently loaded onto a vessel.

* * * * *